United States Patent [19]
Plumpe et al.

[11] 3,718,660
[45] Feb. 27, 1973

[54] ARYLSULPHONYL UREAS CONTAINING HETEROCYCLIC ACYLAMINO GROUPS

[75] Inventors: Hans Plumpe; Walter Puls, Wuppertal-Elberfeld, Germany

[73] Assignee: Farbenfabriken Bayer Aktiengesellschaft, Leverkusen, Germany

[22] Filed: Oct. 28, 1968

[21] Appl. No.: 771,318

[30] Foreign Application Priority Data

Nov. 2, 1967 Germany..................P 16 70 945.8

[52] U.S. Cl.......260/307 D, 260/247.1, 260/268 BC, 260/268 C, 260/293.54, 260/293.58, 260/293.67, 260/302 F, 260/302 H, 260/302 A, 260/307 H, 260/310 R, 424/248, 424/267, 424/270, 424/272, 424/273
[51] Int. Cl. ..............................................C07d 85/22
[58] Field of Search..................260/307 H, 247.1, 268 BC, 268 C, 260/293.54, 293.58, 293.67, 307 D

[56] References Cited
UNITED STATES PATENTS 3,400,122  9/1968  Albrecht et al...................260/239.9

*Primary Examiner*—Alex Mazel
*Assistant Examiner*—R. V. Rush
*Attorney*—Jacobs & Jacobs

[57] ABSTRACT

Blood sugar lowering compounds useful as oral antidiabetics are provided. The compounds have low toxicity and are well tolerated. They are arylsulphonyl ureas having heterocyclic acylamino groups such as N-[4-($\beta$-[3-methylisoxazolyl-(5)-carboxamido]-ethyl)-benzene-sulphonyl]-N'-cyclohexyl-urea and its congeners and analogs administrable in tablets or capsules containing for example 1 mg of active agent. The compounds can be prepared in several ways such as by reacting an appropriate amine or amine salt with a heterocyclic acylamino group-containing arylsulphonamide derivative or corresponding arylsulphonylisocyanate. The substituents on the benzene ring are preferably para to one another but may be in the ortho and meta positions to each other. The reactions can be carried out with or without a solvent or diluent and are exothermic or heated at elevated temperature.

23 Claims, No Drawings

ARYLSULPHONYL UREAS CONTAINING HETEROCYCLIC ACYLAMINO GROUPS

It is known that arylsulphonyl urea derivatives possess a blood sugar depressing action. The compound N-(4-methyl benzene-sulphonyl)-N'-butyl urea (tolbutamide), in particular, has attained great importance as a pharmaceutical agent due to its blood sugar depressing properties while simultaneously having good compatibility.

The present invention relates to new heterocyclic acylamino-containing sulphonyl ureas of the formula:

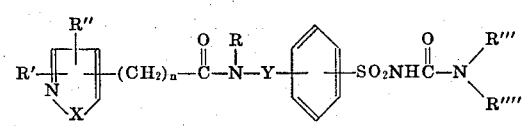

in which
R is hydrogen or alkyl,
R' and R'' are each individually hydrogen, halogen atoms or alkyl, or aryl, aralkyl or cycloalkyl radicals which are unsubstituted or substituted by halogen, alkyl, alkoxy or trifluoromethyl,
R''' and R'''' are each hydrogen, alkyl, hydroxyalkyl, alkoxyalkyl, phenoxyalkyl, unsubstituted or alkyl-substituted cycloalkyl, cycloalkylalkyl, bicycloalkyl, bicycloalkylalkyl, tricycloalkyl, tricycloalkylalkyl, tetracycloalkyl or tetracycloalkylalkyl, aryl or aralkyl unsubstituted or substituted by halogen, alkyl, alkoxy or trifluoromethyl, or together, with the adjacent nitrogen atom, a monocyclic or polycyclic radical having one or more hetero atoms and which are unsubstituted or alkyl-substituted;
X is oxygen, sulphur, nitrogen substituted by hydrogen, or alkyl, aryl or aralkyl which is unsubstituted or substituted by halogen, alkyl, alkoxy or trifluoromethyl;
Y is a direct bond, a straight chain or branched alkylene radical of one to eight carbon atoms, and
n is a number between 0 and 4; the substituents on the benzene ring stand in the ortho-, meta-, but preferably in the para-position towards one another.

These new compounds, either by themselves or in the form of their alkali metal or alkaline earth metal salts, possess a strong blood sugar depressing action which is superior to that of tolbutamide.

They are therefore intended to be used as pharmaceutical agents to be administered per os for the treatment of diabetes.

The new arylsulphonyl urea derivatives are prepared:
a. by reacting an amine of the formula HNR'''R'''' in which R''' and R'''' have the same meaning as above, optionally also in the form of their salts, with a heterocyclic acylamino group-containing arylsulphonamide derivative of the formula:

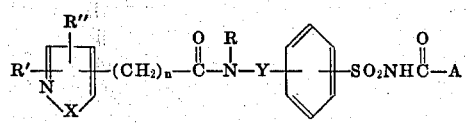

in which

R, R', R'', X, Y and n have the same meaning as above, and
A is a radical which is eliminated in the course of the reaction with the hydrogen atom present on the nitrogen atom of the amine HNR'''R'''' with the splitting off of a compound HA,
or with a corresponding arylsulphonyl-isocyanate of the formula:

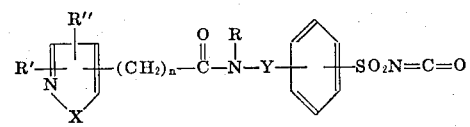

in which
A is, for example, halogen, azido, alkoxy, aryloxy, alkylmercapto or arylmercapto group or substituted or unsubstituted amino, cyclic amino or acylamine; or
b. by reacting an arylsulphonamide of the formula:

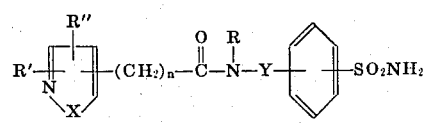

in which
R, R', R'', X, Y and n have the same meaning as above, by itself or in the form of an alkali metal salt with an amine derivative of the formula: B — CO — NR'''R'''' or, if R''' is hydrogen, with an isocyanate $O=C=N-R''''$, in which B is a radical which reacts in the course of the reaction with a hydrogen atom of the sulphonamide group or the alkali metal atom M of the corresponding sulphonamide alkali metal salt with the elimination of HB or MB; B is, for example, halogen, azido, alkoxy, aryloxy, alkylmercapto or arylmercapto, substituted or unsubstituted amino, cyclic amino or acylamino; or
c. by reacting an arylsulphonyl halide of the formula:

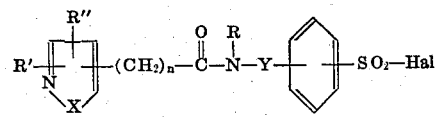

in which
R, R', R'', X, Y and n have the same meaning as above, and Hal is a halogen atom, especially chlorine or bromine, with an urea of the formula $H_2N - CO - NR'''R''41$; or
d. by converting an arylsulphonyl compound of the formula:

in which

R, R', R'', R''', R'''', X, Y and $n$ have the same meaning as above, into the desired products of the process, in the case of thioureas (Z = SH) by oxidative hydrolysis, in the case of arylsulphonyl guanidines (Z = NH$_2$), arylsulphonyl-O-alkyl-isoureas (Z = O —alkyl), arylsulphonyl-S-alkyl-isothioureas (Z = S — alkyl), or arylsulphonyl-isourea chlorides (Z = chlorine) by an acid or alkaline hydrolysis; or e. by acylating an amino-(alkyl)-benzene-sulphonyl urea of the formula:

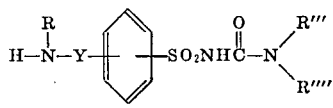

in which
Y, R, R''' and R'''' have the same meaning as above, with a carboxylic acid or derivative:

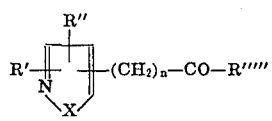

in which
R', R'', X and $n$ have the same meaning as above, and R''''' is a group which reacts with the hydrogen on the amino group of its aforementioned reaction component with the elimination of R''''' H; in this context R''''' is hydroxy, alkoxy or aryloxy or a halogen atom, preferably chlorine; or f. by oxidizing a benzene-sulphenyl urea (m = 0) or a benzene-sulphinyl urea (m = 1) of the formula:

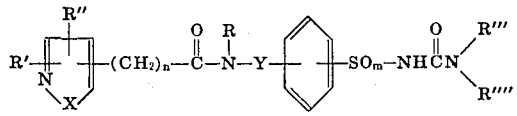

in which
R, R', R'', R''', R'''', X and Y and n have the same meaning as above;
or g. by reacting a sodium salt of an N-bromoamide:

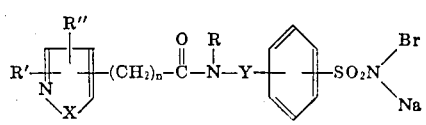

with a formamide:

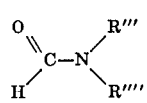

in which
R, R', R'', R''', R'''', X, Y and n have the same meaning as above; or h. by hydrolyzing a parabanic acid derivative of the formula:

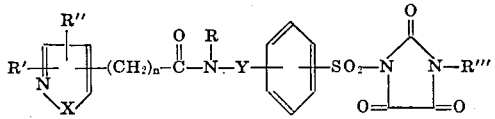

in which
R, R', R'', R''', X, Y and $n$ have the same meaning as above;
or i. by allowing water to react with an N-sulphonylcarbonyl-diimide of the formula:

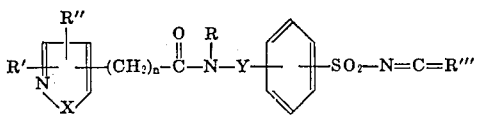

in which
R, R', R'', R''', X, Y and $n$ have the same meaning as above.

Each of the end products of the methods (h) and (i) has hydrogen as the substituent R''''.

Carboxylic acids on which the heterocyclic acyl radical in the end products claimed are based, are the following, for example:
isoxazole-(5)-carboxylic acid, 3-methylisoxazole-(5)-carboxylic acid, 5-methyl-isoxazole-(3)-carboxylic acid, 5-methyl-3-phenylisoxazole-(4)-carboxylic acid, 3-(2',5-dichlorophenyl)-5-methyl-isoxazole-(4)-carboxylic acid, 3,5-dimethyl-isoxazole-(4)-carboxylic acid, isoxazole-(3)-carboxylic acid, isoxazole-(4)-carboxylic acid, 3-methyl-isoxazole-(4)-carboxylic acid, 5-methylisoxazole-(4)-carboxylic acid, 4,5-dimethylisoxazole-(3)-carboxylic acid, 5-hexyl-isoxazole-(3)-carboxylic acid, 5-octylisoxazole-(3)-carboxylic acid, 5-phenylisoxazole-(3)-carboxylic acid, 5-tert.-butyl-3-phenyl-isoxazole-(4)-carboxylic acid, 3,5-diphenyl-isoxazole-(4)-carboxylic acid, 3-ethyl-5-methylisoxazole-(4)-carboxylic acid, 5-methyl-3-phenylisoxazole-(4)- carboxylic acid, 3-phenylisoxazole-(4)-carboxylic acid, 5-phenylisoxazole-(4)-carboxylic acid, 4-chloro-3-methylisoxazole-(5)-carboxylic acid, 4-phenyl-isoxazole-(5)-carboxylic acid, 3,4-tetramethylene-isoxazole-(5)-carboxylic acid, 4,5-tetramethyleneisoxazole-(3)-carboxylic acid, β-isoxazolyl-(5)-propionic acid, 3,5-dimethyl-isoxazolyl-(4)-acetic acid, 4-phenyl-isothiazole-(3)-carboxylic acid, 5-phenyl-isothiazole-(3)-carboxylic acid, isothiazole-(4)-carboxylic acid, 3-methyl-isothiazole-(4)-carboxylic acid, 3,5-dimethyl-isothiazole-(4)-carboxylic acid, 3-methyl-5-benzylisothiazole-(4)-carboxylic acid, 3-methyl-5-ethyl-isothiazole-(4)-carboxylic acid, 3-methyl-5-propylisothiazole-(4)-carboxylic acid, 3-ethyl-5-phenyl-isothiazole-(4)-carboxylic acid, isothiazole-(5)-carboxylic acid, 3-methylisothiazole-(5)-carboxylic acid, 4-methyl-isothiazole-(5)-carboxylic acid.

Also, pyrazole-(3)-carboxylic acid, pyrazole-(4)-carboxylic acid, 1-methyl-pyrazole-(5)-carboxylic acid, 4-methylpyrazole-(5)-carboxylic acid, 3-methylpyrazole-(4)-carboxylic acid, 3-methylpyrazole-(5)-carboxylic acid, 1-phenylpyrazole-(3)-carboxylic acid, 1-phenyl-pyrazole-(4)-carboxylic acid, 1-phenylpyrazole-(5)-carboxylic acid, 4-phenylpyrazole-(3)-carboxylic acid, 3-phenylpyrazole-(4)-carboxylic acid, 3-phenyl-pyrazole-(5)-carboxylic acid, 3-methyl-1-phenyl-pyrazole-(4)-carboxylic acid, 5-methyl-1-phenyl-pyrazole-(4)-carboxylic acid, 5-methyl-1-phenyl-pyrazole-(3)-carboxylic acid, 3-methyl-1-phenyl-pyrazole-(5)-carboxylic acid, 1-methyl-5-phenyl-pyrazole-(3)-carboxylic acid, 1-methyl-5-phenyl-pyrazole-(5)-carboxylic acid, 4-methyl-3-phenyl-pyrazole-(5)-carboxylic acid, 3-methyl-5-phenyl-pyrazole-(4)-carboxylic acid, 1,4-dimethyl-pyrazole-(3)-carboxylic acid, 1,4-dimethylpyrazole-(5)-carboxylic acid, 1,5-dimethylpyrazole-(3)-carboxylic acid, 1,3-dimethyl-pyrazole-(5)-carboxylic acid,1,4-dimethylpyrazole-(5)-carboxylic acid, 3,5-dimethyl-pyrazole-(4)-carboxylic acid, 4,5-dimethylpyrazole-(3)-carboxylic acid.

For introducing the sulphonamide component into the end products the following are suitable, for example: 3-aminobenzene-sulphonamide, 4-aminobenzene-sulphonamide, 4-aminomethylbenzene-sulphonamide, 4-($\alpha$-aminoethyl)-benzenesulphonamide, 4-($\beta$-aminoethyl)-benzene-sulphonamide, 4-($\alpha$-aminopropyl)-benzene-sulphonamide, 4-($\beta$-aminopropyl)-benzenesulphonamide, 4-($\gamma$-aminopropyl-sulphonamide), 4-($\alpha$-amino-$\alpha,\alpha$-dimethylmethyl)-benzene-sulphonamide, 4-methyl-aminobenzenesulphonamide, and similar compounds in the form of their bases or as salts with acids.

As amines on which the group —NR'''R'''' in the products of the present invention are based the following may be used, for example: methylamine, ethylamine, propylamine, isopropylamine, butylamine and their higher, straight chain or branched homologues, particularly those containing up to twelve carbon atoms; furthermore aniline, benzylamine, $\alpha$-phenethylamine, cyclohexylmethylamine, bicyclo-[2,2,1]-heptyl-(2)-methylamine, tetracyclo-(2,2,1,0$^{2,6}$2.$^5$)-nonyl-(8)-methylamine,cyclopentylamine, cyclohexylamine, cycloheptylamine, bicyclo-[2,2,1]-heptyl-(2)-amine, nortricyclylamine, adamantyl-amine, adamantyl-methylamine as well as their alkyl substitution products, such as, e.g., 4-methyl-cyclohexylamine, 2,6-dimethylcyclohexylamine, 2-methyl-bicyclo[2,2,1]-heptyl-(2)-methylamine, $\alpha$[bicyclo-[2,2,1)-heptyl-(2)]-ethylamine, 2a, 4,5,6,7,7a-hexahydro-4,7-methano-indanyl-(1)-amine,fenchylamine or bornylamine; also methoxy-propylamine, phenoxyethylamine, tetrahydrofurfuryl-methylamine, 1-methyl-tetrahydrofurfuryl-methylamine; furthermore unsaturated amines, such as allylamine or cyclohexen-(1)-yl-ethylamine; furthermore dimethylamine, diethylamine and homologous dialkylamines with straight chain or branched, saturated or unsaturated alkyl radicals containing altogether 12 carbon atoms, N-methylbenzylamine, N-methyl-cyclohexylamine, N-methyl-cyclohexylmethylamine, pyrrolidine, piperidine, morpholine, hexamethyleneimine, 4-methyl-piperidine-(4), 3-azabicyclo-[3,2,0]-heptane, 3-aza-bicyclo-[3,2,1]-octane, 6-azabicyclo-[3,2,1]-octane,3-azabicyclo-[3,2,2]-nonane, 3-azabicyclo-[3,3,1]-nonane, 2-azabicyclo-[2,2,2]-octane, nortropane, granatanine and their alkyl-substitution products camphidine, 4,7-endocyclo-propylene-$\Delta^5$-hexahydroisoindole, 4,7-endocyclobutenylene-$\Delta^5$-hexahydroisoindole, 4,7-endocyclobutylene-octahydroisoindole.

Dependent on the method employed, the amines are used by themselves or in the form of their derivatives, such as carbamic acid chlorides, carbamic acid esters or carbamic acid azides.

The reactions are carried out without or in suitable solvents or diluents, and the reaction itself proceeds, depending upon the reactivity of the components, exothermically or its course has to be forced or promoted by applying elevated temperatures. The end products can, moreover, be converted into therapeutically applicable non-toxic salts.

Products of the present invention which contain one or more optically active carbon atoms can be obtained, not only in the form of their racemates, but also in their optically active forms by either using for their production from the start an appropriate, optically active bicyclic amino compound or, alternatively, by subjecting racemic intermediate stages or end products to a racemate splitting.

EXAMPLE 1

(a) 80 g (0.55 mol) of 3-Methyl-isoxazole-(5)-carboxylic acid chloride were introduced in portions into 118 g (0.52 mol) of 4-$\beta$-aminoethylbenzene-sulphonamide hydrochloric in 500 ml of pyridine at a temperature between 0° and 20° C. The mixture was stirred at room temperature for one hour and at 60° C. a further hour, then poured into ice-water, the precipitate filtered off with suction, washed with water and recrystallized from ethanol with the addition of activated charcoal. There were obtained 113 g (71 percent of theory) of 4-[$\beta$-[3-methylisoxazolyl-(5)-carboxamido]-ethyl)-benzene-sulphonamide in the form of colorless crystals of m.p. 219°– 220° C. (Kofler heating block).

(b) 7.3 g (0.024 mol) of 4-($\beta$-[3-methylisoxazolyl-(5)-carboxamido]-ethyl)-benzene-sulphonamide were stirred under reflux for 30 minutes in 125 ml of methyl ethyl ketone with 4.1 g (0.05 mol) of powdered potassium carbonate; 4.4 g (0.035 mol) of cyclohexyl-isocyanate were then added dropwise at 20° C. while stirring, the mixture was stirred at room temperature for 30 minutes and under reflux for 2 hours; after cooling the mixture, the precipitate was filtered off with suction, dissolved in water, the solution filtered and acidified with hydrochloric acid. The precipitated product was filtered off with suction, washed with water and dried. There were thus obtained 8.5 g (82 percent of theory) of N-[4-($\beta$-[3-methyl-isoxazolyl-(5)-carboxamido]-ethyl)-benzene-sulphonyl ]-N-'-cyclohexyl-urea in the form of a colorless, finely crystalline powder of m.p. 206° C. (Kofler heating block).

EXAMPLE 2

By analogy to Example 1(b) there are obtained from 4-($\beta$-[3-methylisoxazolyl-(5)-carboxamido]-ethyl)-benzenesulphonamide and propylisocyanate, the compound N-4-($\beta$-[3- methylisoxazolyl-(5)-carboxamido]-ethyl)-benzene-sulphonyl]-N'-propyl urea of m.p. 214° C.;

and butylisocyanate, the compound N-[4-(β[3-methylisoxazolyl-(5)-carboxamido]-ethyl)-benzene-sulphonyl]-N'-butyl urea of m.p. 195° to 197° C.;
and 2,5-endomethylene-cyclohexyl-methylisocyanate, the compound N-[4-(β-[3-methylisoxazolyl-(5)-carboxamido]-ethyl)-benzene-sulphonyl]-N'-(2,5-endomethylene-cyclohexyl-methyl)-urea of m.p. 203° C.;
and 1-methyl-2,5-endomethylene-cyclohexyl-methylisocyanate the compound N-[4-(β-[3-methylisoxazolyl-(5)-carboxamido]-ethyl)-benzene-sulphonyl]-N'-(1-methyl-2,4-endomethylene-cyclohexylmethyl)-urea of m.p. 199° C.;
and nortricyclylisocyanate, the compound N-[4-(β-[3-methyl-isoxazolyl-(5)-carboxamido]-ethyl)-benzene-sulphonyl]-N'nortricyclyl-urea of m.p. 181° C.;
and 4-methylcyclohexylisocyanate, the compound N-[4-(β-[3-methylisoxazolyl-(5)-carboxamido]-ethyl)-benzene-sulphonyl]-N'-(4-methylcyclohexyl)-urea of m.p. 220° C.;
and phenylisocyanate, the compound N-[4-(β-[3-methylisoxazolyl-(5)-carboxamido]-ethyl)-benzene-sulphonyl]-N'-phenyl-urea of m.p. 200° C.;
and allyl-isocyanate, the compound N-[4-(β-[3-methylisoxazolyl-(5)-carboxamido]-ethyl)-benzene-sulphonyl]-N'-allyl-urea of m.p. 214° C.; and 2,6-dimethylcyclohexylisocyanate, the compound N-[4-(β-[3-methylisoxazolyl-(5)-carboxamido]-ethyl)-benzene-sulphonyl]-N'-(2,6-dimethylcyclohexyl)-urea of m.p. 225° to 232° C.; and cyclododecyl-isocyanate, the compound N-[4-(β-[3methylisoxazolyl-(5)-carboxamido]-ethyl)-benzene-sulphonyl]-N'-cyclododecyl-urea of m.p. 224° C.;
and 1,6,6-trimethyl-2,5-endomethylene-cyclohexyl-isocyanate, the compound N-[4-[3-methylisoxazolyl-(5)-carboxamido]-ethyl)-benzene-sulphonyl]-N'-(1,6,6-trimethyl-2,5-endomethylene-cyclohexyl)-urea of m.p. 110° C.

EXAMPLE 3

By analogy to Example 1 there are obtained from 3-phenyl-5-methyl-isoxazole-(5)-carboxylic acid chloride and 4-(β-aminoethyl)-benzene-sulphonamide hydrochloride, the 4-(β-[3-phenyl-5-methyl-isoxazolyl-(4)-carboxamido]-ethyl)-benzene-sulphonamide in the form of colorless crystals of m.p. 216° C.; from dimethyl formamide/water and therefrom with cyclohexyl-isocyanate, the N-[4-(β-[3-phenyl-5-methylisoxazolyl-(4)-carboxamido]-ethyl)-benzene-sulphonyl]-N'-cyclohexyl urea of m.p. 205° C. (from methanol).

In corresponding manner there are obtained from 3-(2',6'-dichlorophenyl)-5-methyl-isoxazolyl-(4)-carboxylic acid chloride and 4-(β-aminoethyl)-benzene-sulphonamide hydrochloride, the compound 4-(β-[3-(2',6'-dichlorophenyl)-5-methyl-isoxazolyl-(4)-carboxamido]-ethyl)-benzen3-sulphonamide of m.p. 194° C. (from dimethyl formamide/water) and therefrom with cyclohexyl-isocyanate, the N-[4-( -[3-(2',6'-dichlorophenyl)-5-methyl-isoxazolyl-(4)-carboxamido)-ethyl]-benzene-sulphonyl]-N'-cyclohexyl urea of m.p. 218° C.

EXAMPLE 4

By analogy to Example 1 there are obtained from 5-methyl-isoxazole-(3)-carboxylic acid chloride and 4-(β-aminoethyl)-benzene-sulphonamide hydrochloride, the 4-(β-[5-methyl-isoxazolyl-(3)-carboxamido]-ethyl)-benzene-sulphonamido in the form of colorless crystals of m.p. 213° to 214° C. (from dimethyl formamide/water) and therefrom with cyclohexyl-isocyanate, the N-[4-(β-[5-methyl-isoxazolyl-(3)-carboxamido]-ethyl)-benzene-sulphonyl]-N'-cyclohexyl urea in the form of a colorless, finely crystalline powder of m.p. 198° C.

EXAMPLE 5

By analogy to Example 1 there are obtained form 3-methyl-isoxazole-(5)-carboxylic acid chloride and 4-aminobenzene-sulphonamide, the 4-[3-methyl-isoxazolyl-(5)-carboxamido]-benzene-sulphonamide in the form of colorless crystals of m.p. 249° C., and therefrom with cyclohexyl-isocyanate the compound N-(4-[3-methyl-isoxazolyl-(5)-carboxamido]-benzene-sulphonyl)-N'-cyclohexyl urea in the form of a colorless powder of m.p. 207° C.

EXAMPLE 6

By analogy to Example 1 there are obtained from 3-methyl-isoxazole-(5)-carboxylic acid chloride and 4-aminomethyl-benzene-sulphonamide, the 4-[3-methyl-isoxazolyl-(5)-carboxamido-methyl]-benzene-sulphonamide in the form of colorless crystals of m.p. 210° to 211° C. and therefrom with cyclohexyl-isocyanate the N-(4-[3-methyl-isoxazolyl-(5)-carboxamido-methyl]-benzene-sulphonyl)-N'-cyclohexyl urea in the form of a colorless powder of m.p. 195° C.

EXAMPLE 7

By analogy to Example 1(b) there are obtained from 4-(β-[5-methyl-isoxazolyl-(3)-carboxamido]-ethyl)-benzene-sulphonamide and butylisocyanate, the compound N-[4-(β-[5-methyl-isoxazolyl-(3)-carboxamido]-ethyl)-benzene-sulphonyl]-N'-butyl-urea of m.p. 178° C.; and 4-methylcyclo-hexyl-isocyanate, the compound N-[4-(β-[5-methylisoxazolyl-(3)-carboximido]-ethyl)-benzene-sulphonyl]-N'-(4-methyl-cyclohexyl)-urea of m.p. 201° C; and 2,6-dimethyl-cyclohexyl-isocyanate, the compound N-[4-(-[5-methyl-isoxazolyl-(3)-carboxamido]-ethyl)-benzene-sulphonyl]-N'-(2,6-dimethylcyclohexyl)-urea of m.p. 214° to 220° C; and nortricyclyl-isocyanate, the compound N-[4-(β-[5-methyl-isoxazolyl-(3)-carboxamido]-ethyl)-benzene-sulphonyl]-N'-nortricyclyl-urea of m.p. 177° to 182° C.; and fenchyl-isocyanate, the compound N-[4-(β-[5-methyl-isoxazolyl-(3)-carboxamido]-ethyl)-benzene-sulphonyl]-N'-fenchyl-urea of m.p. 189° to 192° C.; and 2,5-endomethylene-cyclohexyl-methyl-isocyanate, the compound N-[4-(β-[5-methyl-isoxazolyl-(3)-carboxamido]-ethyl)-benzene-sulphonyl]-N'-(2,5-endomethylene-cyclohexyl-methyl)-urea of m.p. 182° C.

EXAMPLE 8

By analogy to Example 1 there are obtained from 3-methyl-isoxazole-(5)-carboxylic acid chloride and 4-(α-aminoethyl)-benzene-sulphonamide, the compound 4-(α-[a93-methyl-isoxazolyl-(5)-carboxamido]-ethyl)-benzene-sulphonamide in the form of colorless crystals of m .p. 172° C., and therefrom with cyclohexyl-isocyanate, the compound N-[4-(α-[3-methyl-isoxazolyl- (5)-carboxamido]-ethyl)-benzene-sulphonyl]-N'-cyclohexyl-urea in the form of colorless crystals of m.p. 190° C.

EXAMPLE 9

By analogy to Example 1 there are obtained from 5-methyl-isoxazole-(3)-carboxylic acid chloride and 4-(α-aminoethyl)-benzene-sulphonamide, the compound 4-(α-[a95-methyl-isoxazolyl-(3)-carboxamido]-ethyl)-benzene-sulphonamide in the form of colorless crystals of m.p. 178° C., and therefrom with cyclohexyl-isocyanate, the compound N-[4-(α-[5-methyl-isoxazolyl-(3)-carboxamido]-ethyl)-benzene-sulphonyl]-N'-cyclohexyl-urea in the form of a colorless crystalline powder of m.p. 173° to 174° C.

In corresponding manner there are obtained with 4-methyl-cyclohexyl-isocyanate, the compound N-[4-(α-[5-methyl-isoxazolyl-(3)-carboxamido]-ethyl)-benzene-sulphonyl]-N'-(4-methyl-cyclohexyl)-urea in the form of a colorless finely crystalline powder of m.p. 192° C.

EXAMPLE 10

By analogy to Example 1 there are obtained from 1-phenylpyrazole-4-carboxylic acid chloride hydrochloride (prepared from the corresponding acid and thionyl chloride) and 4-(β-aminoethyl)-benzene-sulphonamide, the compound 4-(β-[1-phenylpyrazolyl-(4)-carboxamido]-ethyl)-benzene-sulphonamide in the form of a colorless crystalline powder of m.p. 240° C., and therefrom with cyclohexyl-isocyanate, the compound N-[4-(β-[1-phenylpyrazolyl-(4)-carboxamido]-ethyl)-benzene-sulphonyl]-N'-cyclohexyl-urea in the form of a colorless crystal powder of m.p. 210° to 214° C.

EXAMPLE 11 a. 92.8 g (0.3 mol) of 4-(β-[3-methyl-isoxazolyl-(5)-carboxamido]-ethyl)-benzene-sulphonamide are heated under reflux for 40 minutes while stirring in 1.5 liter of methyl ethyl ketone with 82.8 g (0.6 mol) of powdered potassium carbonate. After cooling the mixture to room temperature, 47.3 g (0.5 mol) of chloroformic acid methyl ester are added dropwise, the mixture is stirred at room temperature for 15 minutes and under reflux for 4 hours, and it is filtered off with suction and washed with methyl ethyl ketone. The residue is dissolved in water, the solution clarified with activated charcoal and the filtrate acidified with hydrochloric acid. The precipitate is filtered off with suction, washed with water and dried. There are obtained 85.6 g (77 percent of theory) of N-[4-(β-[3-methyl-isoxazolyl-(5)-carboxamidol-ethyl)-benzene-sulphonyl]-methyl urethane in the form of a colorless, finely crystalline powder of m.p. 184° C.

b. 7.3 g (0.02 mol) of this compound are dissolved in 150 ml of methanol, 2.5 g (0.022 mol) of cyclopentylamine are added and the methanol is distilled off, finally under reduced pressure. The residue is finally heated at 110° to 120° C. for 30 minutes, which solidifies as a solid mass and is recrystallized from methanol. There are obtained 5.4 g (70 percent of theory) of N-[4-(β-[3-methyl-isoxazolyl-(5)-carboxamido]-ethyl)-benzene-sulphonyl)-N'-cyclopentyl-urea in the form of colorless crystals of m.p. 227° C.

EXAMPLE 12 a. By analogy to Example 11(a) there are obtained from 4(β[5-methyl-isoxazolyl-(3)-carboxamido]-ethyl)-benzene-sulphonamide and chloroformic acid methyl ester in a yield of 69percent the compound N-[4-(β-[5-methyl-isoxazolyl-(3)-carboxamido]-ethyl)-benzene-sulphonyl]-methyl-urethane in the form of colorless crystals of m.p. 173° C.

b. From the sulphonyl urethane described above and cyclopentylamine there are obtained, in analogy to the method described in Example 11(b), in a yield of 52 percent, the compound N-[4-(β-[5-methyl-isoxazolyl-(3)-carboxamido]-ethyl)-benzene-sulphonyl]-N'-cyclopentyl-urea in the form of colorless crystals of m.p. 210° C.

EXAMPLE 13

By analogy to Example 11(b) there are obtained from N-[4-(β-[3-methyl-isoxazolyl-(5)-carboxamido]-ethyl)-benzene-sulphonyl]-methyl-urethane and benzylamine, the compound N-[4-(β-[3-methylisoxazolyl-(5)-carboxamido]-ethyl)-benzene-sulphonyl]-N'-benzyl-urea of m.p. 180° C.;

β-(cyclohexene-1-yl)-ethylamine, the compound N-[4-(β-[3-methyl-isoxazolyl-(5)-carboxamido]-ethyl)-benzene-sulphonyl]-N'-[β-(cyclohexene-1-yl)-ethyl]-urea of m.p. 190° to 194° C.; and cyclooctylamine, the compound N-[4-(β-[3-methylisoxazolyl-(5)-carboxamido]-ethyl)-benzene-sulphonyl]-N'-cyclooctyl-urea of m.p. 174° C.;

and hexahydrobenzylamine, the compound N-[4-(β-[3-methylisoxazolyl-(5)-carboxamido]-ethyl)-benzene-sulphonyl]-N'-hexahydrobenzyl-urea of m.p. 190° to 192° C.;

and 4,7-endocyclobutylene-(1',2')-octahydroisoindole; the compound N-[4-(β-[3-methylisoxazolyl-(5)-carboxamido]-ethyl)-benzene-sulphonamidocarbonyl]-4,7-endocyclobutylene-(1',2')-octahydro-isoindole of m.p. 145° C.;

and 1-phenyl-cyclohexylamine, the compound N-[4-(β - 3 - methylisoxazolyl - (5) - carboxamido] - ethyl) - benzene-sulphonyl]-N'-(1-phenyl-cyclohexyl)-urea of m.p. 181°– 183° C.;

and cycloheptylamine, the compound N-[4-( -[3-methylisoxazolyl-(5)-carboxamido]-ethyl)-benzene-sulphonyl]-N'-cycloheptyl urea of m.p. 199° C.

EXAMPLE 14

By analogy to Example 11(b) there are obtained from N-[4-(β-[5-methylisoxazolyl-(3)-carboxamido]-ethyl)-benzene-sulphonyl]-methyl-urethane and hexahydrobenzylamine, the compound N-[4-(β-[5-methylisoxazolyl-(3)-carboxamido]-ethyl)-benzene-sulphonyl]-N'-hexahydrobenzyl-urea of m.p. 140° C.;

and β-(cyclohexene-1-yl)-ethylamine, the compound N-[4-(β-[5-methyl-isoxazolyl-(3)-carboxamido]-ethyl)-benzene-sulphonyl]-N'-[β-(cyclohexene-1-yl)-ethyl]-urea of m.p. 196° to 198° C.; and 1-phenylcyclohexylamine, the compound N-[4-(β-[5-methyl-isoxazolyl-(3)-carboxamido]-ethyl)-benzene-sulphonyl]-N'-(1-phenylcyclohexyl)-urea of m.p. 193° C.;

and cycloheptylamine, the compound N-[4-(β-[5-methylisoxazolyl-(3)-carboxamido]-ethyl)-benzene-sulphonyl]-N'-cycloheptyl-urea of m.p. 187° C., and cyclooctylamine, the compound N-[4-(β-[5-methylisoxazolyl-(3)-carboxamido]-ethyl)-benzene-sulphonyl]-N'-cyclooctyl-urea of m.p. 173° C.;

and 4,7-endocyclobutylene-(1',2')-octahydroisoindole, the compound N-[4-(β-[5-methylisoxazolyl-(3)-carboxamido]-ethyl-benzene-sulphonamidocarbonyl]-4,7-endocyclobutylene-(1',2')- octahydroisoindole of m.p. 198° C.;

and hexahydro-β-phenethylamine, the compound N-[4-(β-[5-methylisoxazolyl-(3)-carboxamido]-ethyl)-benzene-sulphonyl]-N'-(hexahydro-β-phenethyl)-urea of m.p. 190° C.;

and pyrrolidine, the compound N-[4-(β-[5-methylisoxazolyl-(3)-carboxamido]-ethyl)-benzene-sulphonamidocarbonyl]-pyrrolidine of m.p. 235° C.;

and piperidine, the compound N-[4-(β-[5-methylisoxazolyl-(3)-carboxamido]-ethyl)-benzene-sulphonamidocarbonyl]-piperidine of m.p. 183° C.;

and hexamethyleneimine, the compound N-[4-(β-[5-methylisoxazolyl-(3)-carboxamido]-ethyl)-benzene-sulphonamidocarbonyl]-hexamethyleneimine of m.p. 186° C.;

and morpholine, the compound N-[4-(β-[5-methylisoxazolyl-(3)-carboxamido]-ethyl)-benzene-sulphoncarbonyl]-morpholine of m.p. 170° C.;

and N-methylpiperazine, the compound N-methyl-N'-[4-(β-[5-methylisoxazolyl-(3)-carboxamido]-ethyl)-benzene-sulphonamidocarbonyl]-piperazine of m.p. 201° C.;

and 2-azabicyclo[2,2,2]octane, the compound N-[4-(β - [5 - methylisoxazolyl - (3) - carboxamido] - ethyl) - benzene-sulphonamidocarbonyl]-2-azabicyclo[3,2,2]octane of m.p. 207°–210° C.;

and 3-azabicyclo[3,2,2]nonane, the compound N-[4-(β-[5-methylisoxazolyl-(3)-carboxamido]-ethyl)-benzene-sulphonamidocarbonyl]-3-azabicyclo[3,2,2]nonone of m.p. 175° C.; and camphidine, the compound N-[4-(β-[5-methylisoxazolyl-(3)-carboxamido]-ethyl)-benzene-sulphonamidocarbonyl]-camphidine of m.p. 179° C.

EXAMPLE 15

15.5 g (0.05 mol) of 4-β-(5-Methylisoxazolyl-(3)-carboxamido]-ethyl-benzene-sulphonamide are stirred at 80° C. for 8 hours in 400 ml of ethoxy ethanol with 6.2 g (0.075 mol) of potassium cyanate dissolved in 15 ml of water, the solvent is drawn off, the residue taken up in water and filtered. The precipitate which separates after acidification of the filtrate with hydrochloric acid, is filtered off with suction, washed with water and dried. There are obtained 8.0 g (45 percent of theory) of 4-(β-[5-methylisoxazolyl-(3)-carboxamido]-ethyl-benzene-sulphonyl-urea in the form of a colorless powder of m.p. 201° C.

EXAMPLE 16

By analogy to Example 1 there are obtained from 5-methyl-isoxazole-3-carboxylic acid chloride and 4-aminomethylbenzene-sulphonamide hydrochloride, the compound 4-[5-methyl-isoxazolyl-(3)-carboxamido-methyl]-benzene-sulphonamide of m.p. 220° C., and therefrom with cyclohexyl-isocyanate, the compound N-(4-[5-methyl-isoxazolyl (3)-carboxamido-methyl]-benzene-sulphonyl)-N'-cyclohexyl-urea of m.p. 209° C.; with cycloheptylisocyanate, the compound N-(4-[5-methylisoxazolyl-(3)-carbonamidomethyl]-benzenesulphonyl)-N'-cycloheptyl-urea of m.p. 209° C.;

with cyclooctylisocyanate, the compound N-(4[5-methylisoxazolyl-(3)-carbonamidomethyl]-benzene-sulphonyl)-N'-cyclohexyl-urea of m.p. 209° C.;

with cycloheptylisocyanate, the compound N-(4-[5-methylisoxazonyl-(3)-carbonamidomethyl]-benzenesulphonyl)-N'-cycloheptyl-urea of m.p. 209° C.;

with cyclooctylisocyanate, the compound N-(4-[5-methyl-isoxazolyl-(3)-carbonamidomethyl]-benzenesulphonyl)-N'-cyclooctyl-urea of m.p. 195° C.

EXAMPLE 17

By analogy to Example 1 there are obtained from 5-methyl-isoxazole-(3)-carboxylic acid chloride and 4-(γ-amino- propyl)-benzene-sulphonamide hydrochloride, the compound 4-(γ-[5-methyl-isoxazolyl-(3)-carboxamido]-propyl)-benzene-sulphonamide of m.p. 171° C. and therefrom with cyclohexylisocyanate, the compound N-[4-(γ-[5-methyl-isoxazolyl-(3)-carboxamido]-propyl)-benzene-sulphonyl]-N'-cyclohexyl-urea in the form of a colorless, finely crystalline powder of m.p. 180°– 182° C.

EXAMPLE 18

By analogy to Example 1 there are obtained from 3,5-dimethyl-isoxazole-(4)-carboxylic acid chloride 4-(β-aminoethyl)-benzene-sulphonamide hydrochloride, the compound N-(β-[3,5-dimethyl-isoxazole-(4)-carboxamido]-ethyl)-benzene-sulphonamide of m.p. 173° C., and therefrom with cyclohexylisocyanate, the compound N-[4-(β-[3,5-dimethyl-isoxazole-(4)-carboxamido]-ethyl)-benzene-sulphonyl]-N'-cyclohexyl-urea of m.p. 167° C. in the form of a colorless, finely crystalline powder.

EXAMPLE 19

By analogy to Example 1 there are obtained from 3,4-tetramethylene-isoxazole-(5)-carboxylic acid chloride and 4-(β-aminoethyl)-benzene-sulphonamide hydrochloride, the compound 4-(β-[3,4-tetramethylene-isoxazole-(5)-carboxamido]-ethyl)-benzene-sulphonamide of m.p. 162°– 165° C., and therefrom with cyclohexyl-isocyanate, the compound N-[4-(β-[3,4-tetramethylene-isoxazole-(5)-carboxamido]-ethyl)-benzene-sulphonyl]-N'-cyclohexyl-urea of m.p. 143°C. in the form of a colorless, finely crystalline powder.

EXAMPLE 20

By analogy to Example 1 there are obtained from 4,5-tetramethylene-isoxazole-(3)-carboxylic acid chloride and 4-(β-aminoethyl)-benzene-sulphonamide hydrochloride, the compound 4-(β-[4,5-tetramethylene-isoxazole-(3)-carboxamido]-ethyl)-benzene-sulphonamide of m.p. 175° C., and therefrom with cyclohexyl-isocyanate, the compound N-[4-(β-[4,5-tetramethylene-isoxazole-(3)-carboxamido]-ethyl)-benzene-sulphonyl]-N'-cyclohexyl-urea of m.p. 153° C. in the form of a colorless, finely crystalline powder.

EXAMPLE 21

By analogy to Example 1 there are obtained from 3,5-dimethyl-isoxazolyl-(4)-acetic acid chloride and 4-(β-aminoethyl)-benzene-sulphonamide hydrochloride, the compound 4-(β-[3,5-dimethyl-isoxazolyl-(4)-acetamido]-ethyl)-benzene-sulphonamide of m.p. 168° C., and therefrom with cyclohexyl-isocyanate, the compound N-[4-(β-[3,5-dimethyl-isoxazolyl-(4)-acetamido]-ethyl)-benzene-sulphonyl]-N′-cyclohexyl-urea in the form of a colorless, finely crystalline powder of m.p. 160°–163° C.

EXAMPLE 22

By analogy to Example 1 there is obtained from 5-methyl-isoxazole-3-carbonic acid chloride and 4-(β-aminopropyl)-benzene-sulphonamide hydrochloride the compound 4-(β-[5-methyl-isoxazolyl-(3)-carbonamido]-propyl)-benzene-sulphonamide of m.p. 174° C. and therefrom with cyclohexyl-isocyanate, the compound N-[4-(β-[5-methyl-isoxazolyl-(3)-carbonamido]-propyl)-benzene-sulphonyl]-N′-cyclohexyl-urea of m.p. 158° C.

EXAMPLE 23

By analogy to Example 1 there is obtained from 5-methylisoxazole-3-carbonic acid chloride and 4-(α-aminopropyl)-benzene-sulphonamide hydrochloride, the compound 4-(α-[5-methyl-isoxazolyl-(3)-carbonamido]-propyl-benzene-sulphonamide of m.p. 165° C., and therefrom with cyclohexyl-isocyanate, the compound N-[4-(α-[5-methyl-isoxazolyl-(3)-carbonamido]-propyl)-benzene-sulphonyl]-N′-cyclohexyl-urea of m.p. 185° C.

EXAMPLE 24

By analogy to Example 1, there is obtained from 1,5-dimethylpyrazolyl-(3)-carbonic acid chloride (prepared from the corresponding carbonic acid and thionyl chloride) and 4-(β-aminoethyl)-benzene-sulphonamide hydrochloride, the compound 4-(β-[1,5-dimethylpyrazolyl-(3)-carboxamido]-ethyl)-benzene-sulphonamide and therefrom with cyclohexyl-isocyanate, the compound N-[4-(β-[1,5-dimethylpyrazolyl-93)-carboxamido]-ethyl)-benzene-sulphonyl]-N′-cyclohexyl-urea of m.p. 205° – 207° C.

EXAMPLE 25

By analogy to Example 1 there is obtained from 3-methylisothiazolyl-(5)-carbonic acid chloride and 4-(β-aminoethyl)-benzene-sulphonamide hydrochloride, the compound 4-(β-]3-methylisothiazolyl-(5)-carboxamido]-ethyl)-benzene-sulphonamide of m.p. 190° C., and therefrom with cyclohexyl-isocyanate, the compound N-[4-(β-[3-methylisothiazolyl-(5)-carboxamido]-ethyl)-benzene-sulphonyl]-N′-cyclohexyl-urea of m.p. 176° C.

EXAMPLE 26

By analogy to Example 1 there is obtained from 5-methylisoxazole-3-carbonic acid chloride and 3-(β-aminoethyl)-benzene-sulphonamide hydrochloride, the compound 3-(β-[5-methylisoxazolyl-(3)-carboxamido]-ethyl)-benzene-sulphonamide of m.p. 155° C., and therefrom with cyclohexylisocyanate, the compound N-[3-(β-[5-methylisoxazolyl-(3)-carboxamido]-ethyl)-benzene-sulphonyl]-N′-cyclohexyl-urea of m.p. 176° C.

The following examples are intended as illustrative and not as limitative but rather representative of the entire genus of compounds described, all of which have effective blood sugar lowering activity and hence are useful as anti-diabetics to replace tolbutamide or provide alternative superior agents for the treatment for diabetes mellitus as shown by comparative tests.

The blood sugar lowering activity of N-[4-(β-[5-methylisoxazolyl-(3)-carboxamido]-ethyl)-benzenesulphonyl]-N′-cyclohexyl urea was compared to tolbutamide, N-(4-tolylsulphonyl)-N′-butyl urea, in rats.

Blood sugar in % of starting values

| Hours after Administration | N-[4-(β-[5-methylisoxazolyl-(3)-carboxamido]-ethyl)-benzenesulphonyl]-N′-cyclohexyl urea | | Tolbutamide | |
|---|---|---|---|---|
| | Dosage mg/kg | | | |
| | 0,1 | 1,0 10 | 5 | 10 |
| 1,5 | 64 | 51 47 | 94 | 90 |
| 3 | 72 | 71 67 | 95 | 86 |

The toxicity of N-[4-(β-[5-methylisoxazolyl-(3)-carboxamido]-ethyl)-benzenesulphonyl]-N′-cyclohexyl urea is low, 2.8 g/kg of body weight being tolerated in the mouse in oral administration. For therapeutic purposes there is, for example, oral administration of N-[4-(β-[5-methylisoxazolyl]-(3)-carbox-amido]-ethyl)-benzenesulphonyl]-N′-cyclohexyl urea in tablets or capsules, for instance in dosages of 1 to 10 mg per person.

TABLETS

The finely pulverized active agent is thoroughly mixed with the requisite additions and compressed into tablets so that each tablet contains the following substances:

1 mg N-[4-(β-[5-methylisoxa-zolyl-(3)-carboxamido]-ethyl)-benzenesulphonyl]-N′-cyclo-hexyl urea
10 mg Colloidal silica
20 mg Cornstarch
1 mg Magnesium stearate
68 mg Lactose

HARD GELATIN CAPSULES

The finely pulverized active agent is mixed with the requisite additives and filled into capsules so that each capsule contains the following substances:

1 mg N-[4-β-[5-methylisoxa-zolyl-(3)-carboxamido]-ethyl)-benzenesulphonyl]-N′-cyclo-hexyl urea
79 mg Lactose
10 mg Cornstarch The invention is defined by the appended claims, wherein the compounds set forth are representative only of the entire genus, all the compounds of which have essentially the same desirable properties and characteristics.

What is claimed is:

1. A compound of the formula:

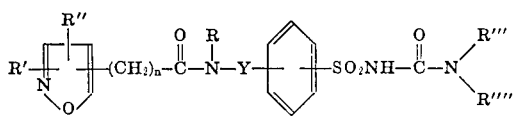

wherein R is hydrogen or methyl;
each of R' and R" when taken individually is hydrogen, halogen, alkyl of one to six carbon atoms, or phenyl; or R' and R" when taken together are tetramethylene; R''' and R''''
1. when taken individually are
   a. hydrogen, b. alkyl of up to 12 carbon atoms, c. phenyl, d. benzyl, e. phenethyl, f. a saturated alicyclic hydrocarbon unsubstituted or substituted by from one to three methyl groups and containing a total of from five to 12 carbon atoms, said alicyclic hydrocarbon being selected from the group consisting of monocycloalkyl, bicycloalkyl and tricycloalkyl; or
   g. methyl or ethyl substituted by said alicyclic hydrocarbon; or
2. when taken together with the nitrogen atom to which they are attached, are an unsubstituted or methyl substituted member selected from the group consisting of pyrrolidino, piperidino, hexamethyleneimino, morpholino, N-methylpiperazine, 4,7-endocyclo- butylene-(1',2')-octahydroisoindol-1-yl, camphidino, 2-azabicyclo[2.2.2.]oct-2-yl and 3-azabicyclo[3.2.2.]non-3-yl;

Y is alkylene of one to eight carbon atoms; and $n$ is a whole number between 0 and 4.

2. An alkali metal or alkaline earth metal salt of a compound of claim 1.

3. The compound according to claim 1 which is N-[4-($\beta$-[5-methylisoxazolyl-(3)-carboxamido]-ethyl)-benzenesulphonyl]-N'-cyclohexyl urea.

4. The compound according to claim 1 which is N-[4-($\beta$-[3-methyl-isoxazolyl-(5)-carboxamido]-ethyl)-benzene-sulphonyl]-N'-cyclohexyl-urea.

5. The compound according to claim 1 which is N-[4-($\beta$-[3-methylisoxazolyl-(5)-carboxamido]-ethyl)-benzene- sulphonyl]-N'-(2,5-endomethylene-cyclohexyl-methyl)-urea.

6. The compound according to claim 1 which is N-[4-($\beta$-[3-methylisoxazolyl-(5)-carboxamido]-ethyl)-benzene-sulphonyl]-N'-(1-methyl-2,5-endomethylene-cyclohexyl-methyl)-urea.

7. The compound according to claim 1 which is N-[4-($\beta$-[3-methylisoxazolyl-(5)-carboxamido]-ethyl)-benzene-sulphonyl]-N'-(4-methyl-cyclohexyl)-urea.

8. The compound according to claim 1 which is N-[4-($\beta$-[5-methylisoxazolyl-(3)-carboxamido]-ethyl)-benzene-sulphonyl]-N'-(4-methylcyclohexyl)-urea.

9. The compound according to claim 1 which is N-[4-($\beta$-[5-methyl-isoxazolyl-(3)-carboxamido]-ethyl)-benzene-sulphonyl]-N'-nortricyclyl-urea.

10. The compound according to claim 1 which is N-[4-($\beta$-[5-methyl-isoxazolyl-(3)-carboxamido]-ethyl)-benzene-sulphonyl]-N'-(2,5-endomethylene-cyclohexyl-methyl)-urea.

11. The compound according to claim 1 which is N-[4-($\alpha$-[3-methyl-isoxazolyl-(5)-carboxamido]-ethyl)-benzene-sulphonyl]-N'-cyclohexyl-urea.

12. The compound according to claim 1 which is N-[4-($\alpha$-[5-methylisoxazolyl-(3)-carboxamido]-ethyl)-benzene-sulphonyl]-N'-cyclohexyl-urea.

13. The compound according to claim 1 which is N-[4-($\beta$-[5-methylisoxazolyl-(3)-carboxamido]-ethyl)-benzene-sulphonyl]-N'-cyclopentyl-urea.

14. The compound according to claim 1 which is N-[4-($\beta$-[3-methylisoxazolyl-(5)-carboxamido]-ethyl)-benzene-sulphonyl]-N'-cyclooctyl-urea.

15. The compound according to claim 1 which is N-[4-($\beta$-[3-methylisoxazolyl-(5)-carboxamido]-ethyl)-benzene-sulphonyl]-N'-cycloheptyl-urea.

16. The compound according to claim 1 which is N-[4-($\beta$-[5-methylisoxazolyl-(3)-carboxamido]-ethyl)-benzene-sulphonamidocarbonyl]-4,7-endocyclobutylene-(1',2')-octahydro-isoindole.

17. The compound according to claim 1 which is N-[4-($\beta$-[3,4-tetramethylene-isoxazole-(5)-carboxamido]-ethyl-benzene-sulphonyl]-N'-cyclohexyl-urea.

18. The compound according to claim 1 which is N-[4-($\beta$-[4,5-tetramethylene-isoxazole-(3)-carboxamido]-ethyl)-benzene-sulphonyl-N'-cyclohexyl-urea.

19. The compound according to claim 1 which is N-[3-($\beta$-[5-methylisoxazolyl-(3)-carboxamido]-ethyl)-benzene-sulphonyl]-N'-cyclohexyl-urea.

20. The compound according to claim 1 which is N-[4-($\alpha$-[5-methylisoxazolyl-(3)-carboxamido]-ethyl)-benzene-sulphonyl]-N'-(4-methyl-cyclohexyl)-urea.

21. The compound according to claim 1 which is N-[4-($\beta$-[5-methylisoxazolyl-(3)-carboxamido]-ethyl)-benzene-sulphonyl]-N'-cyclooctyl-urea.

22. The compound according to claim 1 which is N-[4-[5-methylisoxazolyl-(3)-carboxamido]-methyl-benzene-sulphonyl]-N'-cyclohexyl-urea.

23. The compound according to claim 1 which is N-[4-($\alpha$-[5-methyl-isoxazolyl-(3)-carboxamido]-propyl)-benzene-sulphonyl]-N'-cyclohexyl-urea.

* * * * *